US012641637B2

(12) United States Patent
Tverdal et al.

(10) Patent No.: US 12,641,637 B2
(45) Date of Patent: May 26, 2026

(54) DIGITAL RADIO COMMUNICATIONS

(71) Applicant: Nordic Semiconductor ASA, Trondheim (NO)

(72) Inventors: Martin Tverdal, Trondheim (NO); Sergey Korotkov, Trondheim (NO); Johan Stridkvist, Trondheim (NO); Rubin Gerritsen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 442 days.

(21) Appl. No.: 17/916,471

(22) PCT Filed: Apr. 1, 2021

(86) PCT No.: PCT/EP2021/058746
§ 371 (c)(1),
(2) Date: Sep. 30, 2022

(87) PCT Pub. No.: WO2021/198481
PCT Pub. Date: Oct. 7, 2021

(65) Prior Publication Data
US 2023/0141113 A1 May 11, 2023

(30) Foreign Application Priority Data
Apr. 1, 2020 (GB) ..................................... 2004828

(51) Int. Cl.
*H04W 74/0808* (2024.01)
*H04W 56/00* (2009.01)

(52) U.S. Cl.
CPC ..... *H04W 74/0808* (2013.01); *H04W 56/004* (2013.01)

(58) Field of Classification Search
CPC ................................................ H04W 74/0808
See application file for complete search history.

(56) References Cited

U.S. PATENT DOCUMENTS

| | | | |
|---|---|---|---|
| 2010/0182981 A1* | 7/2010 | Thoukydides | H04J 3/0658 370/336 |
| 2014/0064212 A1* | 3/2014 | Ko | H04L 1/0083 370/329 |

(Continued)

FOREIGN PATENT DOCUMENTS

| EP | 2 163 041 A1 | 3/2010 |
|---|---|---|
| WO | WO 2009/013238 A1 | 1/2009 |

OTHER PUBLICATIONS

IPO Search Report under Section 17(5) for GB2004828.6, mailed Nov. 24, 2020, 3 pages.

(Continued)

*Primary Examiner* — Huy D Vu
*Assistant Examiner* — Latha Chakravarthy
(74) *Attorney, Agent, or Firm* — Klarquist Sparkman, LLP

(57) ABSTRACT

A method of operating a digital radio transmitter device in accordance with a predetermined communication protocol defining a transmission timing tolerance. The method comprises: transmitting a plurality of first periodic transmissions in accordance with said predetermined communication protocol having a first period and an inherent timing uncertainty less than said transmission timing tolerance; performing a plurality of second periodic actions with a second period wherein said first and second periods are equal to each other or an integer multiple of each other; and adjusting a timing of one or more of the first periodic transmissions by an amount greater than said inherent timing uncertainty but less than or equal to a difference between said inherent timing uncertainty and said transmission timing tolerance so as to change said first period temporarily by an amount less than or equal to said transmission timing tolerance, thereby (Continued)

changing an offset between said first transmissions and said second actions.

14 Claims, 7 Drawing Sheets

(56)                    References Cited

U.S. PATENT DOCUMENTS

2017/0026906 A1 *   1/2017   Neti ................... H04W 52/028
2017/0265101 A1 *   9/2017   Ben-Shachar ...... H04W 74/085

OTHER PUBLICATIONS

International Search Report and Written Opinion for PCT/EP2021/058746, mailed May 11, 2021, 14 pages.

* cited by examiner

DIGITAL RADIO COMMUNICATIONS

CROSS REFERENCE TO RELATED APPLICATIONS

This is the U.S. National Stage of International Application No. PCT/EP2021/058746, filed Apr. 1, 2021, which was published in English under PCT Article 21(2), which in turn claims the benefit of Great Britain Application No. 2004828.6, filed Apr. 1, 2020.

FIELD

This invention relates to short-range, ad hoc radio communication networks. Such networks, which include for example Bluetooth™, have many uses for transferring data between, and controlling, a whole variety of different devices.

BACKGROUND

Under the Bluetooth™ protocol, there exist periodic connection events which comprise designated time slots in which a central device may transmit and receive data packets to/from a peripheral device. The start time of a connection event is set by the timing of an initial transmission from the central device to the peripheral and is referred to as an anchor point under the Bluetooth™ protocol.

Internal clocks of radio transceivers are not perfect and individual devices arranged to operate under the Bluetooth™ protocol will differ, with different oscillator frequencies and rates of clock drift. As a result of this, devices arranged to operate under the Bluetooth™ protocol are required to accept a tolerance in the timing of an anchor point according to the Bluetooth™ specification. More specifically the Bluetooth™ specification specifies that devices must allow for +/−16 μS variation in timing of connection events in addition to the inherent timing uncertainty arising from their own clock drift.

It is common for devices arranged to operate under the Bluetooth™ specification also to support communication with other external devices through other means. For example, devices may be arranged to communicate over wired connections e.g. Ethernet, Serial Peripheral Interface (SPI), Universal Asynchronous Receiver/Transmitter (UART), etc. and/or other wireless connections e.g. Wifi, 5G, LTE, etc. Under these external connection protocols there may exist periodic connection events much like those specified in the Bluetooth™ protocol, and these external connection events may share the same period as Bluetooth™ periodic connection events.

The Applicant has recognised there exist situations where a device is arranged to communicate via Bluetooth™ with a peripheral device while simultaneously communicating via a different communication protocol with a different external device. In these situations it may be desirable to be able to choose the offset between the periodic connection events under the Bluetooth™ protocol and periodic connection events with the different external device under the different communication protocol, e.g. to introduce a latency from each Bluetooth™ connection event to each external connection event to allow time for data received during a Bluetooth™ connection event to be transmitted over the external interface in the subsequent connection event.

SUMMARY

When viewed from a first aspect the present invention provides a method of operating a digital radio transmitter device in accordance with a predetermined communication protocol defining a transmission timing tolerance, the method comprising:

transmitting a plurality of first periodic transmissions in accordance with said predetermined communication protocol having a first period and an inherent timing uncertainty less than said transmission timing tolerance;

performing a plurality of second periodic actions with a second period wherein said first and second periods are equal to each other or an integer multiple of each other;

adjusting a timing of one or more of the first periodic transmissions by an amount greater than said inherent timing uncertainty but less than or equal to a difference between said inherent timing uncertainty and said transmission timing tolerance so as to change said first period temporarily by an amount less than or equal to said transmission timing tolerance, thereby changing an offset between said first transmissions and said second actions.

The invention extends to a computer readable medium comprising instructions configured to cause a digital radio transmitter device to operate in accordance with the method set forth above.

The invention also extends to a digital radio transmitter device configured to operate in accordance with a predetermined communication protocol defining a transmission timing tolerance, wherein the device is configured to:

transmit a plurality of first periodic transmissions in accordance with said predetermined communication protocol having a first period and an inherent timing uncertainty less than said transmission timing tolerance;

perform a plurality of second periodic actions with a second period wherein said first and second periods are equal to each other or an integer multiple of each other;

adjust a timing of one or more of the first periodic transmissions by an amount greater than said inherent timing uncertainty but less than or equal to a difference between said inherent timing uncertainty and said transmission timing tolerance so as to change said first period temporarily by an amount less than or equal to said transmission timing tolerance, thereby changing an offset between said first transmissions and said second actions.

Thus it will be seen by those skilled in the art that in accordance with the present invention the offset between periodic digital radio protocol transmissions and other periodic actions can be adjusted to suit a users' need or a particular application by exploiting the difference between the lower actual transmission uncertainty that the device can achieve and the tolerance allowed for in the protocol specification. By introducing such a deliberate change in the timing of the protocol transmissions the offset between them and the second periodic actions, typically not specified in accordance with the protocol, can be changed whilst remaining compliant with the protocol.

The change in the offset between the first and second periodic transmissions could be an increase or a decrease. The offset could be zero initially or could be adjusted to be zero. For example, a user may wish to reduce a latency between the first periodic transmissions and the second periodic actions. Alternatively, the user may wish to adjust the offset between the first periodic transmissions and the second periodic actions to a specific, known value. Of course the offset could also be changed from one non-zero value to another.

Whilst one may be an integer multiple of the other, in a set of embodiments the first and second periods are equal.

The timing of more than one of said first periodic transmissions may be adjusted in order to obtain an offset between the first transmissions and second actions that is greater than the difference between the inherent timing uncertainty and the transmission timing tolerance—i.e. greater than an offset that could be obtained by adjusting the timing of only one of said first periodic transmissions. In other words, the timing of more than one of said first periodic transmissions may be adjusted in order to progressively build up any desired offset, which could therefore result in a relatively large offset. Where more than one of said first periodic transmissions are adjusted, these may be consecutive. This may allow a change in offset to be applied progressively.

In a set of embodiments the first predetermined communication protocol is one compatible with a Bluetooth™ protocol—e.g. Bluetooth™ Low Energy. In a set of embodiments the second periodic action is triggered by an event in another subsystem of the device—e.g. the second periodic action could comprise transmission or reception of a signal in accordance with another radio protocol such as LTE, WiFi, Zigbee etc. or a proprietary radio protocol or a wired communication protocol such as SPI or UART. In one specific example the second periodic action comprises receipt of synchronisation signal from a sensor over an SPI.

In a set of embodiments the first periodic transmissions comprise initial transmissions of a periodic connection event in accordance with the predetermined communication protocol. Such a connection event might comprise a designated timeslot for transmission and reception of data packets between a central device and a connected peripheral device. The start time of each connection event may be determined by the timing of a previous connection event.

In a set of embodiments the transmission timing tolerance specified in the protocol is +/−16 μS. This means that the total timing uncertainty at the transmission side would be 16 μS in addition to the inherent timing uncertainty (e.g. resulting from clock drift). At the receiver side, the total uncertainty would further depend on the inherent timing uncertainty or clock drift of the receiver.

In a set of embodiments the magnitude of the inherent timing uncertainty which the device is able to achieve is between 1 and 10 μS—e.g. between 2 and 8 μS.

BRIEF DESCRIPTION OF THE DRAWINGS

An embodiment of the invention will now be described, by way of example only, with reference to the accompanying drawings in which.

4

Figure 5:
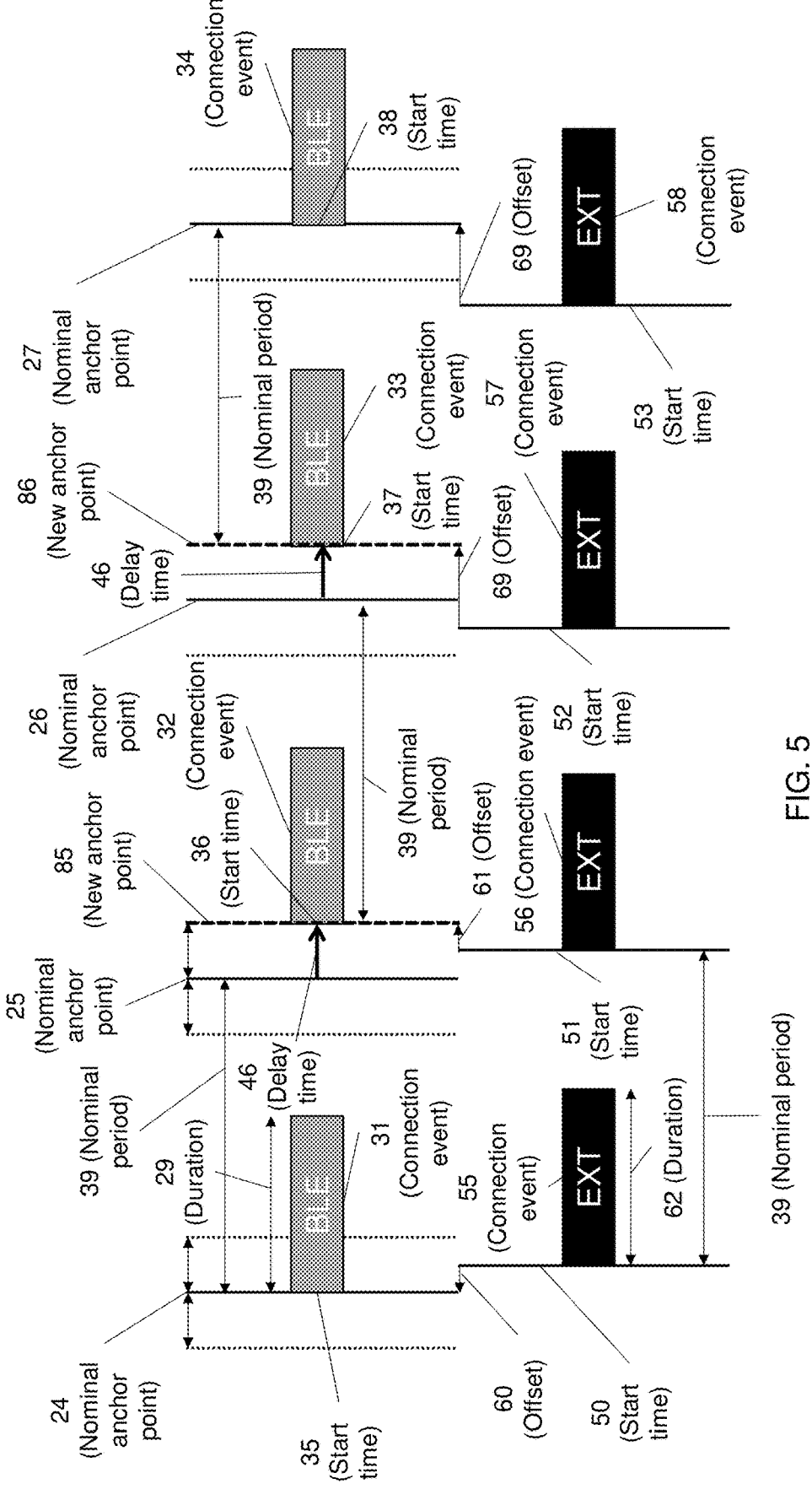
FIG. 5 is a schematic diagram illustrating how the offset between periodic Bluetooth™ connection events and periodic external events having the same nominal period can be adjusted.
Figure 6:
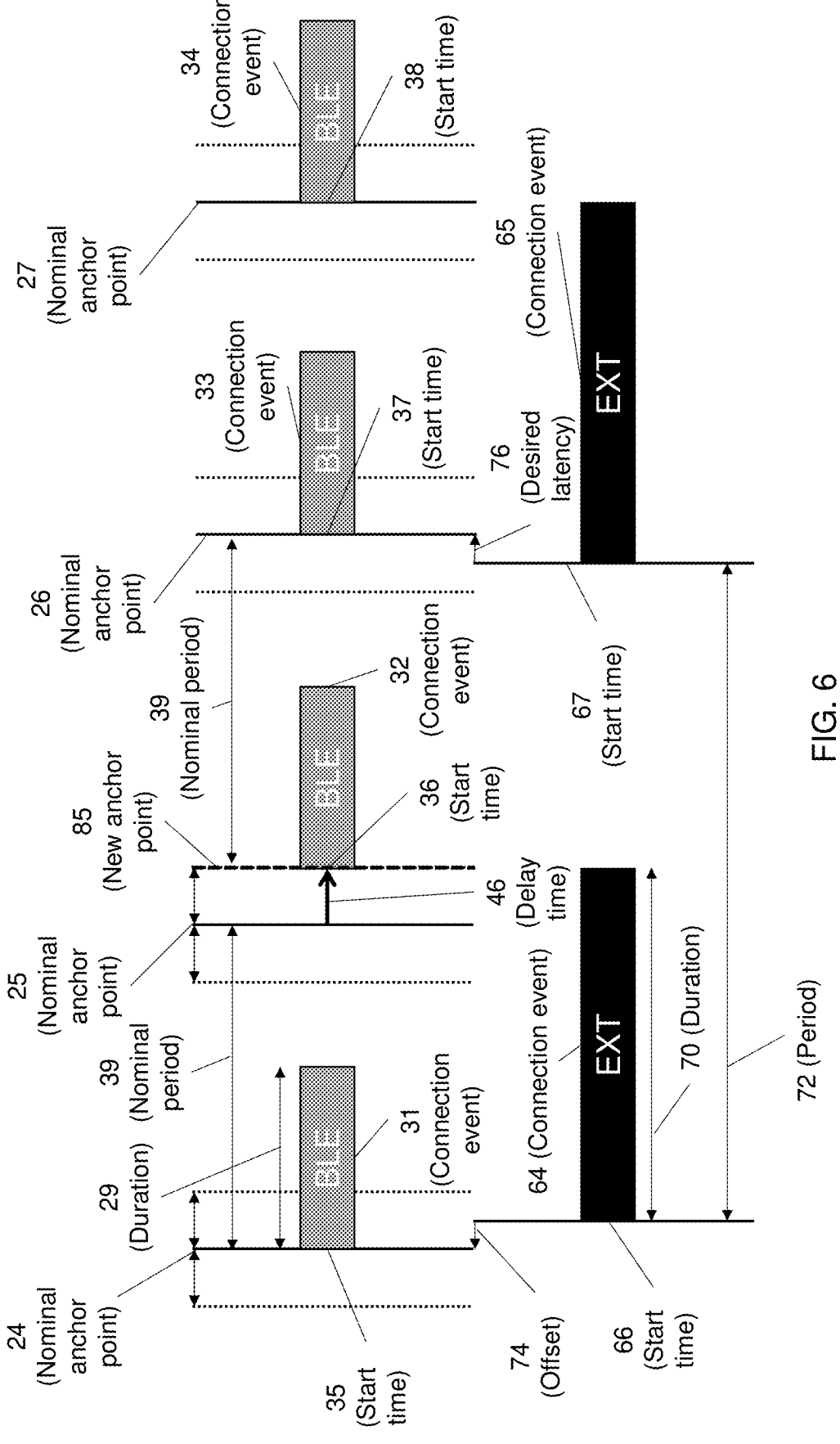

FIG. 6 is a schematic diagram similar to FIG. 5 wherein the external events have a period that is twice that of the Bluetooth™ connection events.

DETAILED DESCRIPTION OF THE DRAWINGS

Figure 1:
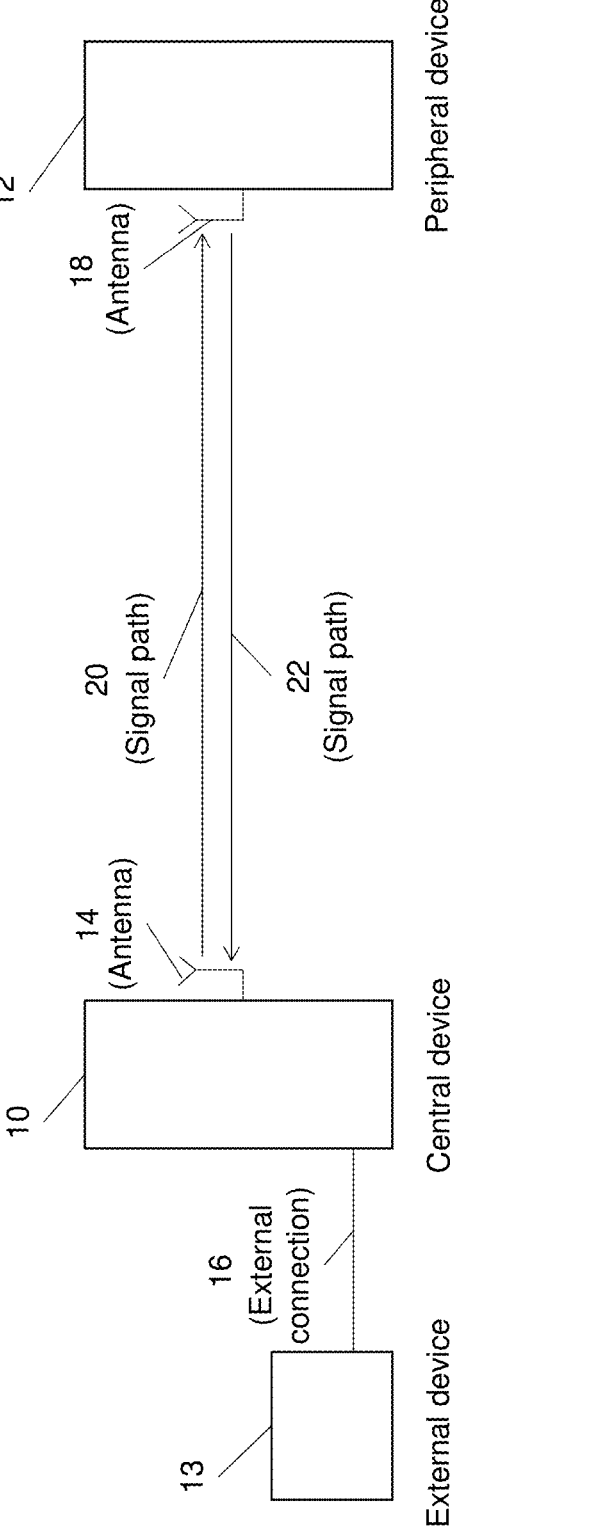
FIG. 1 is a schematic diagram illustrating a typical radio communication system.

FIG. 1 shows a radio system comprising a central radio transceiver device 10 operating in accordance with Bluetooth Low Energy™, a peripheral radio transceiver device 12 also operating in accordance with Bluetooth Low Energy™ and an external device 13. Hereafter, these will be referred to as the central device 10, peripheral 12 and external device 13. The central device 10 comprises an antenna 14 and the peripheral 12 comprises an antenna 18. The central device 10 and external device 13 are coupled via an external connection 16. The external connection 16 may comprise a wireless connection (e.g. WiFi) or a wired connection (e.g. Ethernet, Serial Bus, etc. . . . ) and data may be transmitted from the central device 10 to the external device 13 and/or from the external device 13 to the central device 10. The external device may comprise any device capable of communication over the external connection 16—e.g. a router, a server, a computer, tablet, smartphone etc.

As will also be well understood by those skilled in the art, a number of standard modules such as processors, oscillators, filters, amplifiers, digital to analogue converters (DACs) and analogue to digital converters (ADCs) are provided in the radio transceivers 10 and 12 but the description of these is omitted for the sake of brevity.

FIG. 1 also shows the signal paths 20 and 22 of the Bluetooth Low Energy™ radio signals. Signal path 20 is from the central device 10 when acting as a transmitter through its antenna 14 to the peripheral 12 when acting as a receiver through its antenna 18. Signal path 22 is from the peripheral 12 when acting as a transmitter through its antenna 18 to the central device 10 when acting as a receiver through its antenna 14.

Figure 2:
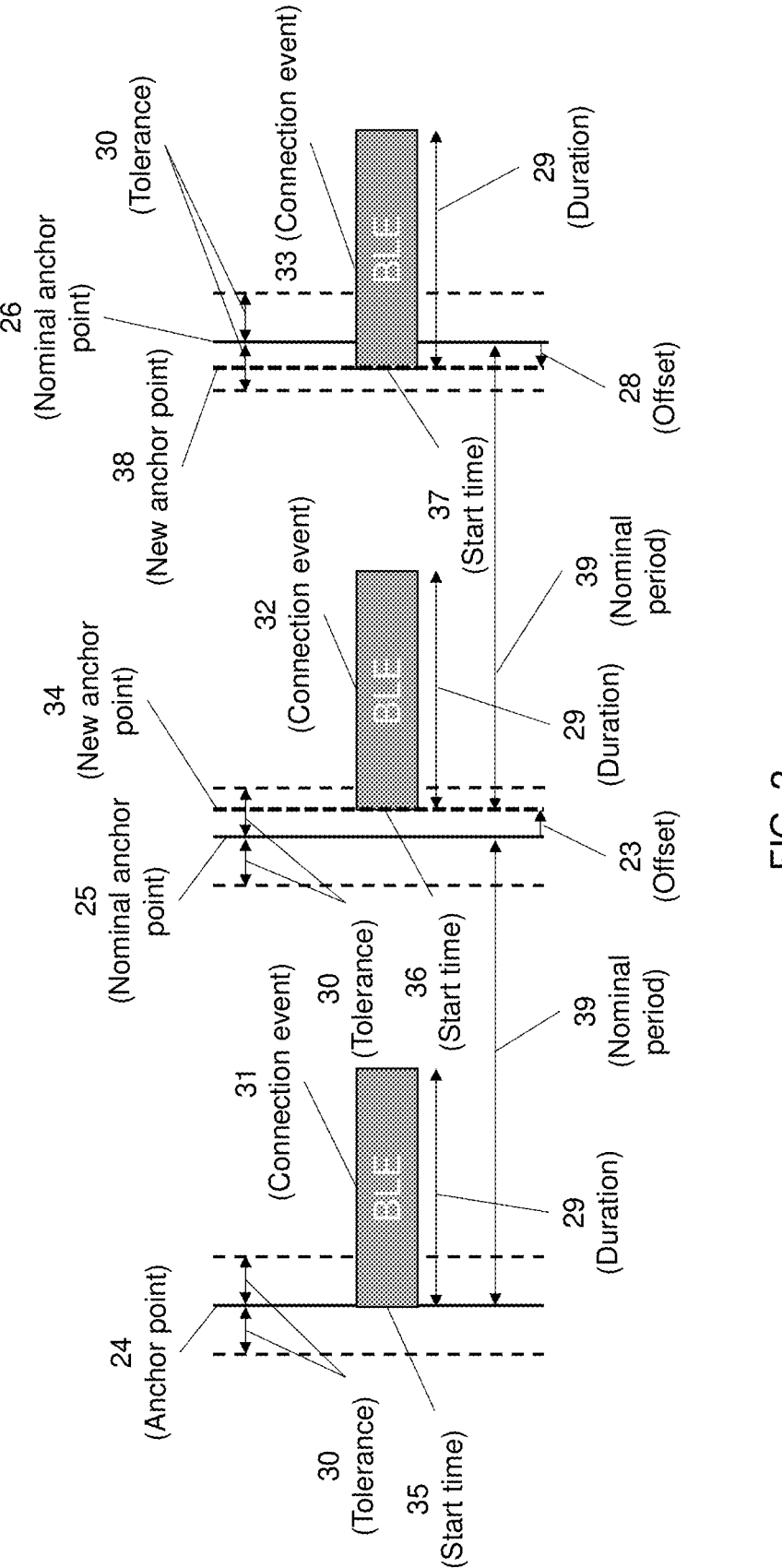
FIG. 2 is a schematic diagram illustrating Bluetooth™ Low Energy (BLE) anchor points and associated timing tolerances.

FIG. 2 illustrates nominal anchor points 24, 25 and 26 as well as their associated timing tolerance 30 for periodic connection events 31, 32 and 33 of duration 29 for the central device 10 in accordance with the Bluetooth Low Energy™ (BLE) specification. The nominal anchor points 24, 25 and 26 occur periodically and designate the nominal start time for connection events 31, 32 and 33. The nominal period 39 between anchor points 24, 25 and 26 is illustrated in FIG. 2.

The duration of a connection event 29 is less than the period 39 between anchor points and it will be understood that the durations 29 of each connection event 31, 32 and 33 need not be identical; each event may have a different duration as long as said duration is less than the period 39. A connection event may comprise any combination of signal transmissions from the central device 10 to the peripheral 12 and reception of signals transmitted from the peripheral 12 to the central device 10.

As illustrated in FIG. 2, the BLE specification allows for small deviations of the actual start time 35, 36 and 37 ($t_{start}$) of respective connection events 31, 32 and 33 from respective nominal anchor points 24, 25 and 26 through the use of a timing tolerance 30 whilst still remaining compliant with the specification. The maximum allowed deviation ($TOL_{max}$) of the start time of connection events 35, 36 and 37 from respective nominal anchor points 24, 25 and 26 is given by:

$$TOL_{max}=\pm(16 \text{ } \mu s+drift_{clock}), \quad (1)$$

5 wherein $\text{drift}_{clock}$ is the drift of the internal clock of central device 10.

As a result, the actual start times 35, 36 and 37 of connection events 31, 32 and 33 are allowed to lie anywhere in the range:

$$t_{anchor}-|TOL_{max}|\leq t_{start}\leq t_{anchor}+|TOL_{max}|, \qquad (2)$$

wherein $t_{anchor}$ is the time of the respective anchor point 24, 25 or 26 for each connection event 31, 32 or 33.

When the start time of a connection event 31, 32 or 33 is offset within the allowed range from a nominal anchor point 24, 25 or 26 respectively, a new anchor point is defined as the actual start time of the connection event. The start time of the first connection event 31 is the same as the nominal anchor point 24, thus no new anchor point is defined. However the second connection event 32 is slightly delayed and therefore its start time 36 is offset from the nominal anchor point 25. The central device 10 and peripheral 12 therefore treat the start time 36 of the second connection event 32 as a new anchor point 34. Hence, the new anchor point 34 is separated from the nominal anchor point 25 by an offset 23. It is from this new anchor point 34 that the timing of the subsequent nominal anchor point 26 is based. In other words the next nominal anchor point 26 is separated from the new anchor point 34 by the nominal period 39.

The third connection event 33 is however slightly advanced such that its start time 37 is offset from the nominal anchor point 26. Once again this provides a new anchor point 38 at the start time 37 of the third connection event 33. Hence, the new anchor point 38 is separated from the nominal anchor point 26 by an offset 28. It will be understood that the timing of subsequent nominal anchor points (not shown in FIG. 2) will be based on the new anchor point 38 with the nominal period 39 unless any further deliberate offsets are applied.

Figure 3:
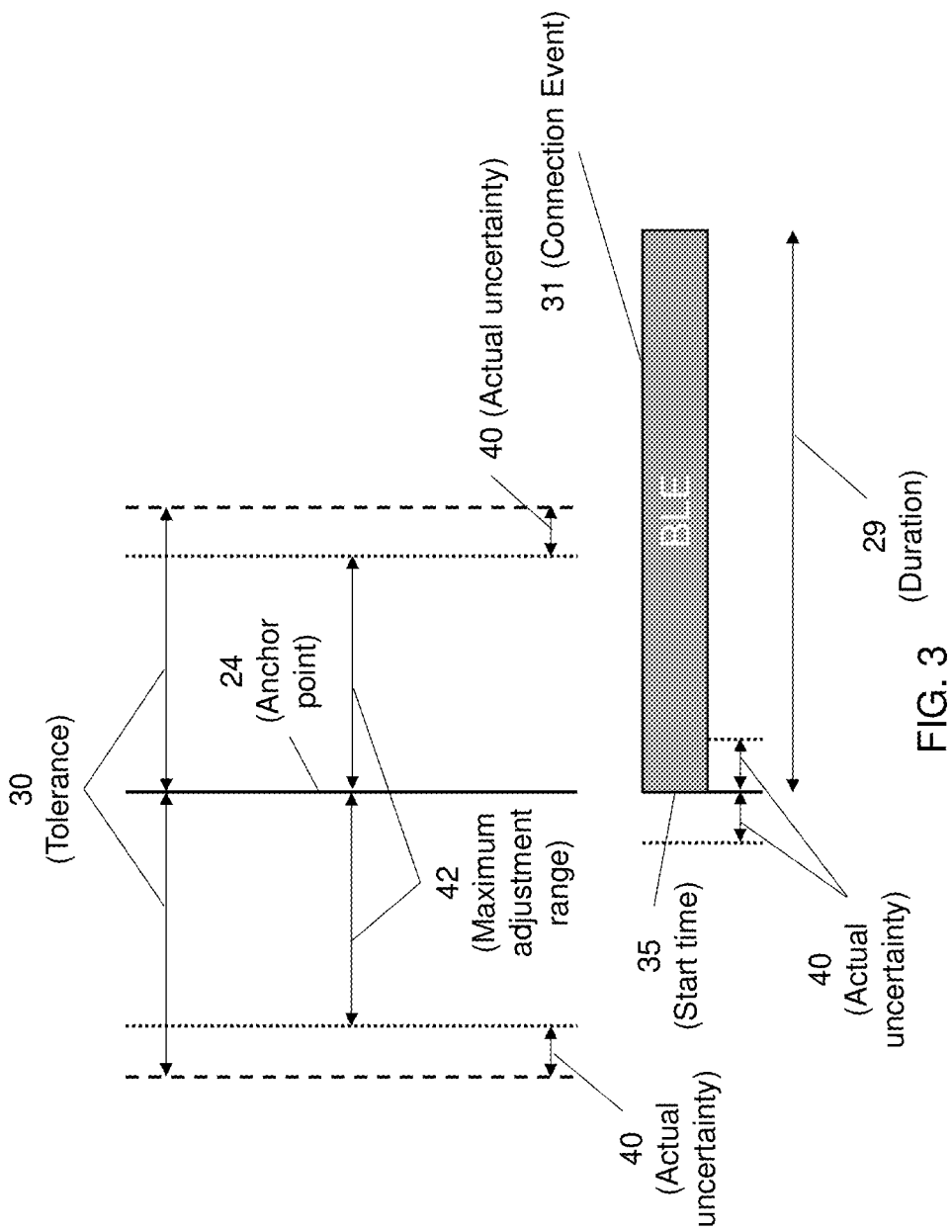
FIG. 3 is a schematic diagram illustrating a comparison between BLE tolerance and actual timing uncertainty.

FIG. 3 illustrates a comparison between the tolerance 30 for an anchor point 24 in accordance with the BLE specification and the actual uncertainty 40 ($TOL_{actual}$) in the start time 35 of a connection event 31 of duration 29 which can be achieved with specific transmission hardware providing better timing drift and jitter than required by the Bluetooth™ specification. In this example, the implementation used allows for the start time of a connection event to be guaranteed with greater accuracy than the BLE specification tolerance 30, giving $TOL_{actual}<TOL_{max}$.

As a result of this, the actual start time 35 may be deliberately adjusted to lie anywhere within a maximum adjustment range 42 ($ADJ_{max}$) while still meeting the BLE specification. The maximum adjustment range 42 is given by:

$$ADJ_{max}=\pm(TOL_{max}-TOL_{actual}), \qquad (3)$$

Therefore the connection event 31 which has an actual uncertainty 40 can be chosen to have an actual start time anywhere in the range:

$$t_{anchor}-|ADJ_{max}|\leq t_{start}\leq t_{anchor}+|ADJ_{max}|, \qquad (4)$$

while still meeting the BLE specification.

Figure 4A:
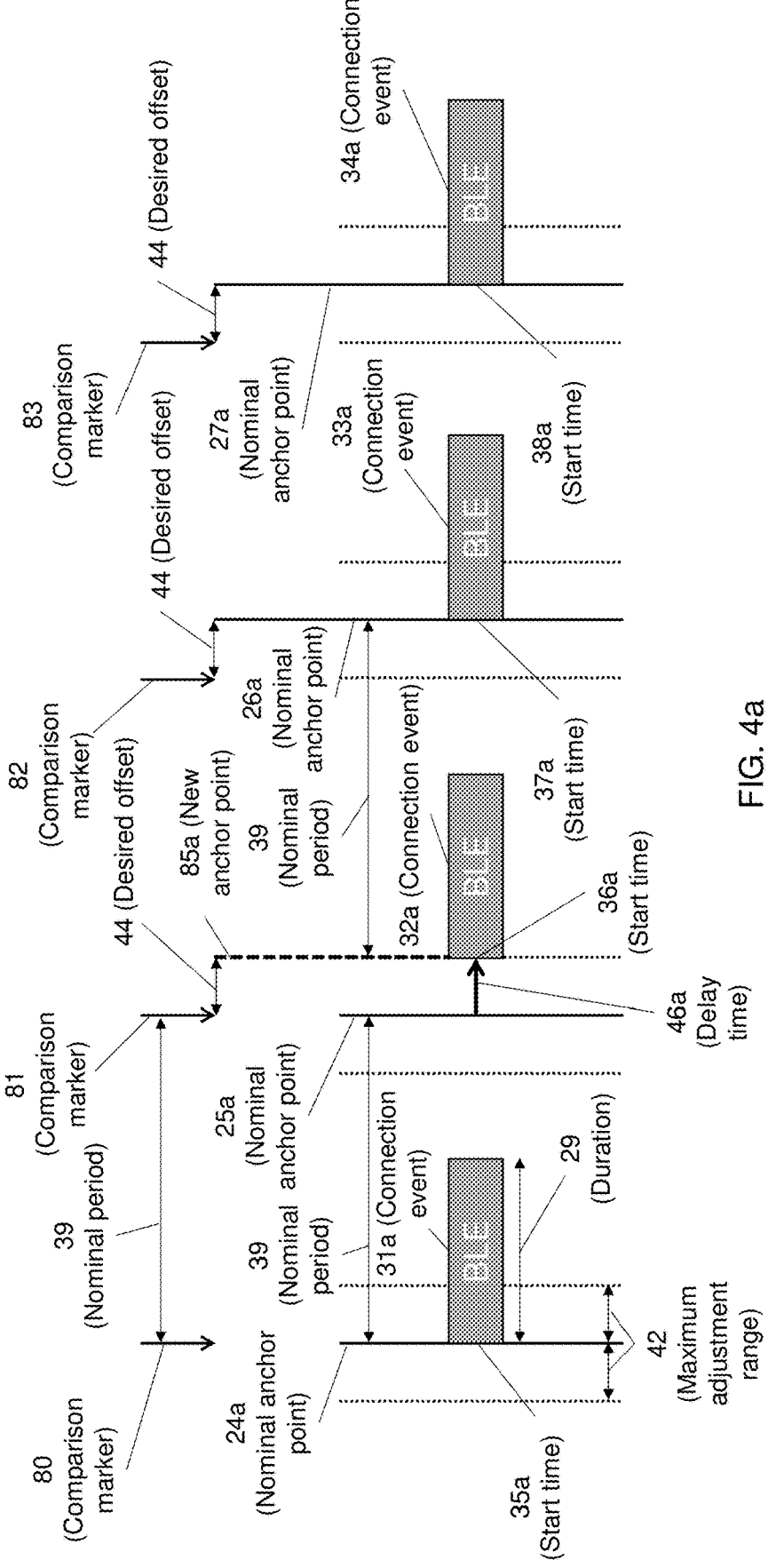
FIGS. 4*a* and 4*b* are schematic diagrams illustrating how the timing of a periodic connection event may be adjusted over the course of a number of periods in accordance with the present invention.
Figure 4B:
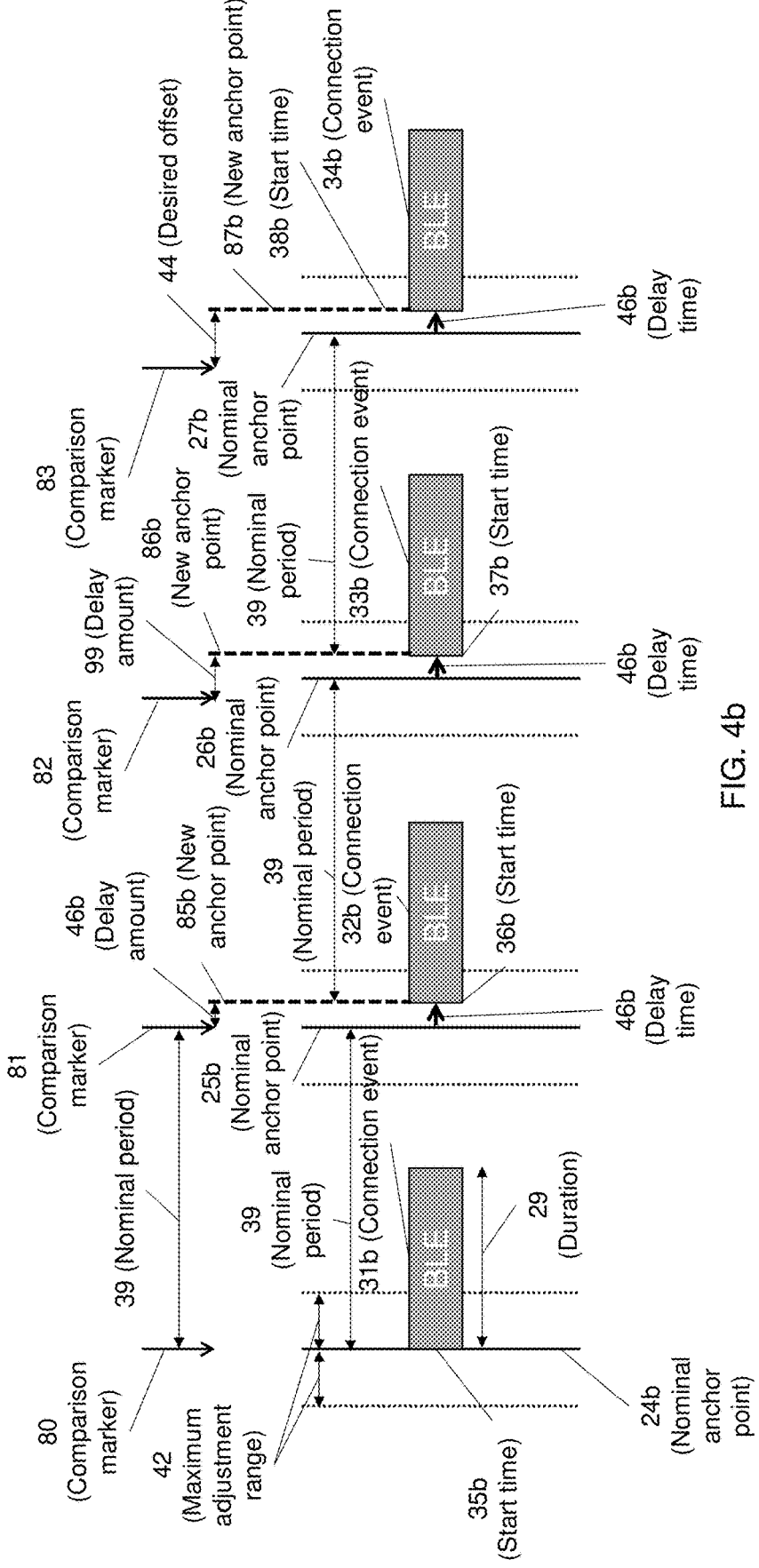

FIGS. 4a and 4b illustrate how the respective start times 35, 36, 37 and 38 of periodic connection events 31, 32, 33 and 34 of duration 29 may be adjusted within the aforementioned maximum adjustment range 42 to reach a desired offset 44 by adjusting the nominal anchor points 24a, 25a, 26a and 27a. For comparison, markers 80, 81, 82, and 83 separated by the nominal period 39 show where the anchor points would have been without adjustment. In this example, the desired offset 44 between connection events 31, 32, 33 and 34 and the comparison markers 80, 81, 82 and 83 is equal to $+ADJ_{max}$.

FIG. 4a shows an example wherein the desired offset 44 is reached within a single cycle. Connection event 31a has a start time 35a equal to the time of its nominal anchor point 24a. The start time 36a of subsequent connection event 32a is intentionally delayed by a delay time ($t_{delay}$) 46a which has the same value as the desired offset 44. As a result, the start time 36a of connection event 32a is offset from its anchor point 25a by the desired offset 44. The anchor point is then reset to a new point 85a for subsequent events. The start times 37a and 38a of the subsequent connection events 33a and 34a are not intentionally delayed further, meaning they are transmitted according to their respective anchor points 26a and 27a but remain offset from what would have been the original anchor points 82 and 83 by the desired offset 44.

FIG. 4b shows an example wherein the desired offset 44 is reached within three cycles. Connection event 31b has a start time 35b equal to the time of anchor point 24b. The start time 36b of the subsequent connection event 32b is intentionally delayed by a delay time 46b which has a value of ⅓ of the desired offset 44. This defines a new anchor point 85b for the central device 10 and the peripheral 12 which means that the start time 36b of the connection event 32b being delayed by an amount 46b relative to what the original anchor point 81 would have been.

The nominal anchor point 26b of the subsequent connection event 33b comes after the nominal period 39 from the new anchor point, 85b but the start time 37b of the this connection event 32b is then further delayed by the same delay time 46b, again giving a revised anchor point 86b and delaying the start time 37b by an amount 99 twice this delay from the original anchor point 82.

Finally, the start time 38b of the last connection event 34b is then further delayed from the nominal anchor point 27b set by the nominal period from the previous anchor point 86b by the same delay time 46b to create a further new anchor point 87b. This results in the total offset of the start time 38b of the last connection event 34b from the original anchor point 83 being equal to $OFF_{des}$, wherein $OFF_{des}$ is the value of the desired offset 44. Subsequent connection events (not shown) are not delayed further, meaning they will occur in accordance with their respective anchor points based on the nominal period 39 and the last reset anchor point 87b.

It will be understood by one skilled in the art that the number of cycles over which a desired offset may be reached is not limited to three, but may be any number. Also, the time delay added to each connection event does not need to be equal as in this example: individual time delays may differ. It will also be understood by one skilled in the art that an offset between the start time of a connection event and its nominal anchor point may be negative—i.e. the start time of a connection event may be advanced such that the connection event occurs before its nominal anchor point.

The action of delaying to the start times of connection events may be considered as equivalent to temporarily decreasing the frequency of connection events for a number of cycles and then returning to the original frequency—the result of which is that the phase of the connection events becomes delayed relative to what they would have been. Similarly, bringing forward the start times of connection events may be considered as temporarily increasing the frequency of connection events for a number of cycles and returning to the original frequency—the result of which is that the phase of the connection events advances relative what they would have been.

FIG. 5 illustrates how adding an offset between the start times of BLE connection events and their respective nominal anchor points may be used to adjust the offset between BLE connection events and other periodic events in the central device 10. In this example, the other periodic events comprise external connection events 55, 56, 57 and 58 to external device 13 over external connection 16. In this example, external connection events 55, 56, 57 and 58 and BLE connection events 31, 32, 33 and 34 have the same nominal period 39, and the durations 29 and 62 of BLE connection events and external connection events respectively are less than the period 39.

In this example, a latency 69 is desired from the start times 50, 51, 52 and 53 of the periodic external communication events 55, 56, 57 and 58 to the start times 35, 36, 37 and 38 of the periodic BLE connection events 31, 32, 33 and 34—e.g. to avoid processor delays or mutual RF interference.

In this example, to begin with, the start times for the periodic external connection events are slightly after the anchor points for the BLE connection events. This is illustrated by the offset 60: the start time 35 of the BLE connection event 31, which is the same as its nominal anchor point 24, is before the start time 50 of the external connection event 55. Assuming that it is in fact desired that the start times of the BLE connection events come after those of the external connection events, the start time 36 of the next BLE connection event 32 is delayed by a delay time 46. As a result, although the nominal anchor point 25 of the BLE connection event 32 remains before the start time 51 of the external connection event 56, the start time 36 of the BLE connection event 32 is offset from the start time 51 of the external event 56 by an offset amount 61.

The start time 37 of the subsequent BLE connection event 33 is then also delayed by the same delay time 46. As a result, although the nominal anchor point 26 of the BLE connection event 33 was already after the start time 52 of the external connection event 57, the start time 37 of the BLE connection event 33 is further delayed from the start time 52 of the external event 57 to give the desired latency 69 and define a new nominal anchor point 86. By adjusting the start time of multiple BLE connection events (the two consecutive connection events 32 and 33 in this example), the offset 69 obtained between the BLE connection event 33 and the external event 57 (and subsequent BLE connection events and external events) is greater than the difference 42 between the inherent timing uncertainty 30 and the transmission timing tolerance 40 (i.e. the offset 69 is greater than the maximum amount by which the start time of a single BLE connection event may be adjusted). Thus, by adjusting the start time of multiple BLE connection events, each of which may or may not be consecutive, the central device 10 is able to adjust the offset between the BLE connection events and the external events to any desired value, particularly to values greater than an offset that could be obtained by adjusting the timing of only one BLE connection event.

The start time 38 of the final BLE connection event 34 is not intentionally delayed further, meaning that its nominal anchor point 27 is separated by one nominal period 39 from the previous new anchor point 86. As a result, the start times of subsequent BLE connection events continue to be offset from the start times of the external connection events by the desired latency 69. It will be understood by one skilled in the art that this approach may be used to adjust the offset between periodic BLE connection events and other periodic events (with the same period) to a desired value while still meeting the BLE specification. It will also be understood that the desired offset can be reached within a single cycle if it is within the maximum allowed adjustment of anchor points, but that greater offsets can accomplished over the course of any number of cycles as demonstrated in FIG. 4*b*.

FIG. 6 illustrates another example wherein adding offsets between the start times of BLE connection events and their nominal anchor point may be used to adjust the offset between BLE connection events and other periodic events in a central device 10. In this example, the other periodic events comprise external connection events 64 and 65 to the external device 13 over the external connection 16. In this example, external connection events 64, 65 and BLE connection events 31, 32, 33 and 34 have different periods, wherein the external connection events have a period 72 that is twice that of the BLE connection events 39. The durations 29 and 70 of BLE connection events and external connection events respectively are less than their respective periods 39 and 72. The ratio of the period 72 to the period 39 is not limited to two as in this example, but may be any integer (thus period 72 is a multiple of period 39). Alternatively the BLE connection events may have a period which is an integer multiple of the period of the external events.

In this example, a short latency 76 is desired from the start times 66 and 67 of periodic external communication events 64 and 65 to the start times 35 and 37 of periodic BLE connection events 31 and 33.

Again, the start times for the periodic external connection events are slightly after the nominal anchor points for the BLE connection events. This is illustrated by the offset 74: the start time 35 of the first BLE connection event 31, which is the same as the nominal anchor point 24, is before the start time 66 of the first external connection event 64. It is desired that the start times of every other BLE connection event come after that of the nearest external connection events. In order to accomplish this, the start time 36 of the next BLE connection event 32 is delayed by a delay time 46. This sets a new anchor point 85 at the start time 36 of the next BLE connection event 32. The timing of subsequent nominal anchor point 26 is then separated by one period 39 from the newly set anchor point 85. As a result, the start time 37 of the subsequent BLE connection event 33 is separated from the start time 67 of the corresponding external connection event 65 by the desired latency 76.

It will be appreciated by those skilled in the art that the examples given above are not limiting and that many modifications and variants are possible within the scope of the invention.

The invention claimed is:

1. A method of operating a digital radio transmitter device in accordance with a predetermined communication protocol defining a transmission timing tolerance comprising a maximum allowed deviation from a nominal start time of a first periodic transmission according to the predetermined communication protocol, the method comprising:

transmitting a plurality of first periodic transmissions in accordance with said predetermined communication protocol having a first period and an inherent timing uncertainty less than said transmission timing tolerance, wherein the inherent timing uncertainty comprises a timing uncertainty arising from inherent limitations of the digital radio transmitter device;

performing a plurality of second periodic actions with a second period wherein said first and second periods are equal to each other or an integer multiple of each other; and adjusting a timing of one or more of the first periodic transmissions by an amount greater than said inherent timing uncertainty but less than or equal to a difference between said inherent timing uncertainty and said transmission timing tolerance so as to change said first period temporarily by an amount less than or equal to said transmission timing tolerance, thereby changing an offset between said first transmissions and said second actions; and adjusting the timing of more than one of the first periodic transmissions in order to obtain an offset between the first transmissions and second actions that is greater than the difference between the inherent timing uncertainty and the transmission timing tolerance.

2. The method as claimed in claim 1, wherein each first periodic transmission comprises an initial transmission of a periodic connection event, each connection event comprising a designated timeslot for transmission and reception of data packets between a central device and a connected peripheral device in accordance with the predetermined radio communication protocol.

3. The method as claimed in claim 2, wherein the timing of each connection event is determined by the timing of a previous connection event.

4. The method as claimed in claim 1, wherein the more than one first periodic transmissions that are adjusted are consecutive.

5. The method as claimed in claim 1, wherein the predetermined communication protocol is Bluetooth™ Low Energy.

6. The method as claimed in claim 1, wherein the magnitude of the inherent timing uncertainty which the device is able to achieve is between 1 and 10 μS.

7. The method as claimed in claim 1, wherein each of the first periodic transmissions are triggered by a first subsystem of the device and each of the second periodic actions are triggered by a second subsystem of the device.

8. The method as claimed in claim 1, wherein each of the second periodic actions comprise transmission or reception of a signal in accordance with another predetermined radio communication protocol.

9. The method as claimed in claim 1, wherein each of the second periodic actions comprise transmission or reception of a signal in accordance with a predetermined wired communication protocol.

10. A non-transitory computer readable medium comprising instructions configured to cause a digital radio transmitter device to operate in accordance with the method as claimed in claim 1.

11. A digital radio transmitter device configured to operate in accordance with a predetermined communication protocol defining a transmission timing tolerance comprising a maximum allowed deviation from a nominal start time of a first periodic transmission according to the predetermined communication protocol, wherein the device is configured to:

transmit a plurality of first periodic transmissions in accordance with said predetermined communication protocol having a first period and an inherent timing uncertainty less than said transmission timing tolerance, wherein the inherent timing uncertainty comprises a timing uncertainty arising from inherent limitations of the digital radio transmitter device;

perform a plurality of second periodic actions with a second period wherein said first and second periods are equal to each other or an integer multiple of each other; and adjust a timing of one or more of the first periodic transmissions by an amount greater than said inherent timing uncertainty but less than or equal to a difference between said inherent timing uncertainty and said transmission timing tolerance so as to change said first period temporarily by an amount less than or equal to said transmission timing tolerance, thereby changing an offset between said first transmissions and said second actions; and adjust the timing of more than one of the first periodic transmissions in order to obtain an offset between the first transmissions and second actions that is greater than the difference between the inherent timing uncertainty and the transmission timing tolerance.

12. The device as claimed in claim 11, wherein the magnitude of the inherent timing uncertainty which the device is able to achieve is between 1 and 10 μS.

13. The device as claimed in claim 11, wherein each of the first periodic transmissions are triggered by a first subsystem of the device and each of the second periodic actions are triggered by a second subsystem of the device.

14. The method as claimed in claim 1, wherein the more than one first periodic transmissions that are adjusted are consecutive.

* * * * *